(12) United States Patent
Rothkopf et al.

(10) Patent No.: US 8,966,408 B2
(45) Date of Patent: Feb. 24, 2015

(54) REMOVABLE CLIP WITH USER INTERFACE

(75) Inventors: Fletcher R. Rothkopf, Mountain View, CA (US); Teodor Dabov, San Francisco, CA (US)

(73) Assignee: Apple Inc., Cupertino, CA (US)

( * ) Notice: Subject to any disclaimer, the term of this patent is extended or adjusted under 35 U.S.C. 154(b) by 611 days.

(21) Appl. No.: 13/180,433

(22) Filed: Jul. 11, 2011

(65) Prior Publication Data

US 2013/0019207 A1    Jan. 17, 2013

(51) Int. Cl.
*G06F 3/14* (2006.01)
*G06F 3/0488* (2013.01)
*G06F 1/16* (2006.01)
*G06F 3/0489* (2013.01)

(52) U.S. Cl.
CPC ............ *G06F 3/0488* (2013.01); *G06F 1/1632* (2013.01); *G06F 3/0489* (2013.01); *G06F 1/1684* (2013.01); *G06F 2203/04809* (2013.01)
USPC ............................ 715/864; 715/835; 715/767

(58) Field of Classification Search
CPC ....................................................... G06F 1/163
USPC .................................................. 715/835, 767
See application file for complete search history.

(56) References Cited

U.S. PATENT DOCUMENTS

| | | | | |
|---|---|---|---|---|
| 7,280,100 | B2 * | 10/2007 | Hanson et al. ................. | 345/169 |
| 7,363,947 | B2 * | 4/2008 | Teicher .......................... | 139/173 |
| 7,386,325 | B2 * | 6/2008 | Charlier et al. ............... | 455/557 |
| 7,618,260 | B2 * | 11/2009 | Daniel et al. .................... | 439/37 |
| 7,623,354 | B2 * | 11/2009 | Koh ............................... | 361/764 |
| 8,203,847 | B2 * | 6/2012 | Koh ............................... | 361/764 |
| 2007/0010116 | A1 * | 1/2007 | Teicher .......................... | 439/173 |
| 2007/0070611 | A1 * | 3/2007 | Koh ............................... | 361/764 |
| 2007/0139873 | A1 * | 6/2007 | Thomas et al. ................ | 361/681 |
| 2007/0240073 | A1 * | 10/2007 | McCarthy et al. ............ | 715/767 |
| 2007/0254523 | A1 * | 11/2007 | Homer et al. ................. | 439/492 |
| 2007/0279852 | A1 * | 12/2007 | Daniel et al. .................. | 361/683 |
| 2008/0274633 | A1 * | 11/2008 | Teicher .......................... | 439/173 |
| 2009/0011621 | A1 * | 1/2009 | Trenne ........................... | 439/68 |
| 2009/0048501 | A1 * | 2/2009 | Goodnow ...................... | 600/316 |
| 2009/0163241 | A1 * | 6/2009 | Vossoughi et al. ......... | 455/556.1 |
| 2010/0061070 | A1 * | 3/2010 | Koh ............................... | 361/764 |
| 2010/0321899 | A1 * | 12/2010 | Vossoughi et al. ............ | 361/728 |
| 2010/0324705 | A1 * | 12/2010 | Vandiver ......................... | 700/94 |
| 2011/0277892 | A1 * | 11/2011 | Black ............................. | 150/148 |
| 2012/0042476 | A1 * | 2/2012 | Karmatz ......................... | 16/421 |
| 2012/0043452 | A1 * | 2/2012 | Karmatz ....................... | 248/558 |
| 2014/0031081 | A1 * | 1/2014 | Vossoughi et al. ......... | 455/556.1 |

* cited by examiner

*Primary Examiner* — William Titcomb
(74) *Attorney, Agent, or Firm* — Kilpatrick Townsend & Stockton LLP

(57) ABSTRACT

Various embodiments of removable user interfaces, electronic computing devices, and systems are described. In one embodiment, an apparatus includes a body having a bend and a user interface area, a connector adapted to couple to a corresponding connector on an electronic device, and a plurality of conductive elements. The bend enables the user interface area to wrap around a portion of the electronic device when the connector is coupled to the corresponding connector on the electronic device. In another embodiment, a portable electronic system includes a removable user interface and an electronic computing device having a display surface, where the removable user interface is couplable to the electronic computing device such that the removable user interface is disposed over at least a part of the display surface.

21 Claims, 14 Drawing Sheets

REMOVABLE CLIP WITH USER INTERFACE

BACKGROUND

1. Field of the Invention

The present invention relates generally to removable clips with user interfaces. More particularly, the present invention relates to a clip that provides a user interface to an electronic computing device and is operable to selectively attach the device to an object.

2. Description of the Related Art

Various types of clips are provided today with portable electronic computing devices such as media players (e.g., music player or video player). The clips today typically serve only one function, which is to clip the device to various objects such as a person's clothing. As a result of such typical purposes of clips, clips usually only operate to mechanically connect the electronic computing device to another object. In some cases, the clips are used with electronic computing devices having electronic displays. In such cases, the clips are necessarily provided on a surface of the device other than the surface having the display, since doing otherwise would result in the clip undesirably interfering with the display. Often, the clip is physically integrated with the electronic computing device such that the clip and device form a single unit. Such a unit necessarily has a thicker width than the electronic computing device alone, which is in many cases disadvantageous for marketing purposes.

While today's clips provide a valuable function for portable electronic computing devices, they are deficient in that the real estate used by the clips is underutilized in that the clips are only used to attach electronic computing devices to other objects. Such underutilization is particularly undesirable as technology continues to miniaturize since even the smallest amount of real estate used by a device is often considered burdensome by a consumer.

SUMMARY

Embodiments of the present invention generally concern systems, apparatus's, and methods for providing a removable clip with a user interface to electronic computing devices. In one embodiment, the user interface may be configured to operate as a clip, thereby enabling the electronic computing device to be removably attached to an object such as a person's clothing. The user interface may also be operable to receive user inputs (via, e.g., a touch pad) and thereby control an electronic computing device. In some embodiments, the user interface may be transparent. As a result, information such as icons displayed on the electronic computing device may be visible to the user via the transparent user interface. The electronic computing device may then be responsive to user engagement with the clip based on locations of the user engagement and their correspondence to the icons displayed on the electronic computing device. In this fashion, a portable user interface may be provided that significantly enhances the functionality and usability of existing devices, and in some cases may also advantageously operate as a clip.

In one embodiment, the user interface may be configured to operate as a clip, and the user interface may be operable to display information (via, e.g., an LCD). By coupling the clip to an electronic computing device, the electronic computing device may thereafter display information on the clip via the user interface. In some embodiments, the display capability of the clip may be combined with the ability to receive user inputs (e.g., a touch pad may be layered over an LCD). In this fashion, a significant amount of functionality may be added to existing devices, and in some cases the device may also advantageously operate as a clip.

Various other features may also provide numerous other advantages over the state of the art. For example, the user interfaces may include tactile feedback elements such as rubber domes. In this fashion, a user may be able to easily cause the electronic device to perform a function without visually seeing the device or user interface.

For a fuller understanding of the nature and advantages of embodiments of the present invention, reference should be made to the ensuing detailed description and accompanying drawings. Other aspects, objects and advantages of the invention will be apparent from the drawings and detailed description that follows. However, the scope of the invention will be fully apparent from the recitations of the claims.

DETAILED DESCRIPTION

Embodiments of the invention are discussed below with reference to FIGS. 1 to 11B. However, those skilled in the art will readily appreciate that the detailed description given herein with respect to these figures is for explanatory purposes only as embodiments of the invention extend beyond these limited embodiments.

Figure 1:
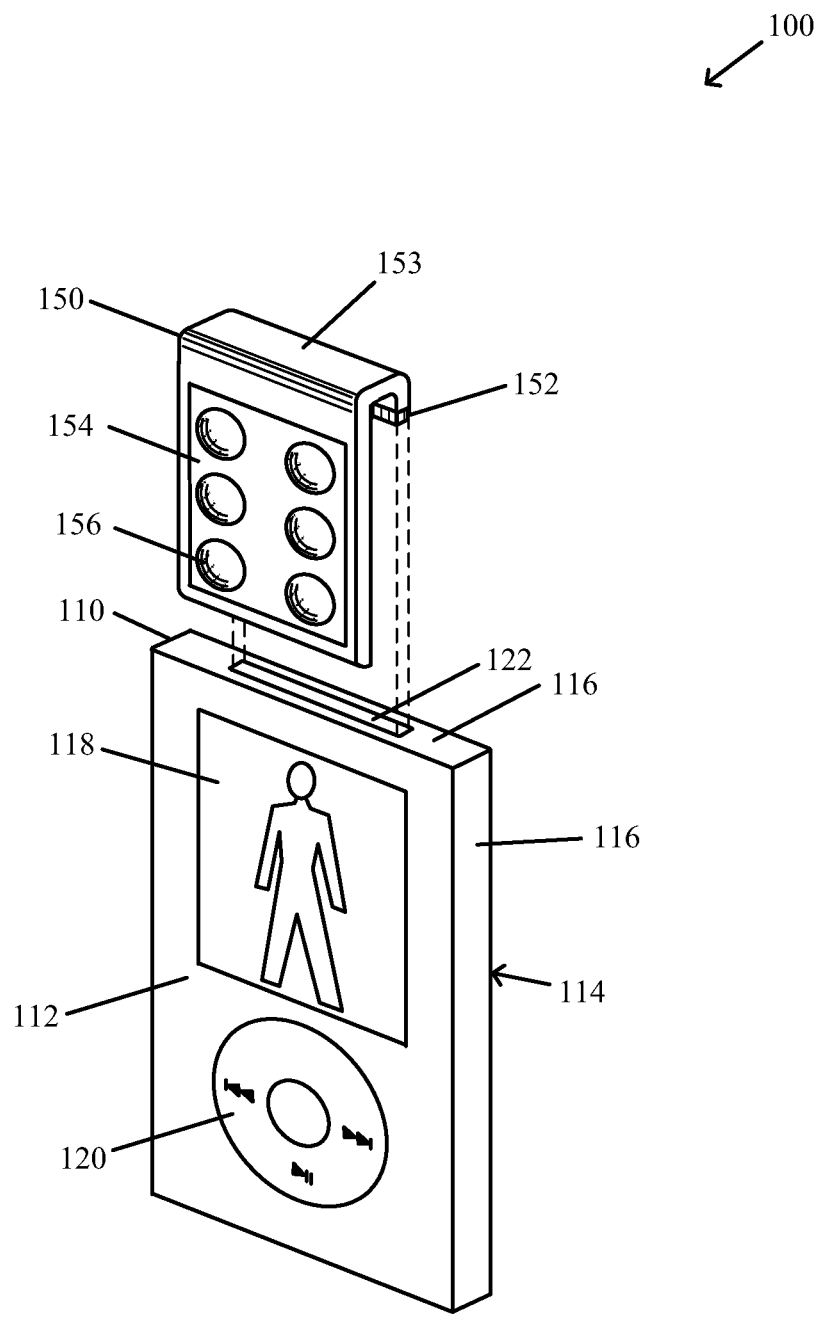
FIG. 1 illustrates a portable electronic system according to a first embodiment.

FIG. 1 illustrates a portable electronic system 100 according to a first embodiment. Portable electronic system 100 includes an electronic computing device 110 and a removable user interface 150.

According to this embodiment, electronic computing device 110 is a portable media player. For example, electronic computing device 110 may be an iPod as manufactured by Apple, Inc. of Cupertino, Calif.; a Microsoft Zune as manufactured by Microsoft Corp. of Redmond, Wash.; a Creative Zen as manufactured by Creative Technology Ltd. of Singapore; etc. According to other embodiments, electronic computing device 110 is not a portable media player. Rather, electronic computing device 110 may be any portable electronic computing device with a receptacle connector for establishing an electrical connection with other devices. For example, electronic computing device 110 may be a cellular phone, a personal digital assistant (PDA), a camera, a game player, a laptop computer, a netbook, a tablet, a booklet, a slate, a convertible notebook, etc.

Electronic computing device 110 includes a number of surfaces. In one embodiment, electronic computing device 110 includes front surface 112, a rear surface 114, and side surfaces 116. Side surfaces 116 are separate from and arranged perpendicular to front surface 112 and rear surface 114. However, such an arrangement is not necessary. For example, one or more of side surfaces 112 and rear surface 114 may form a continuous surface. In one embodiment, front surface 112 is arranged opposite to rear surface 114. Front surface 112 may be parallel to rear surface 114, but may alternatively be angled with respect to rear surface 114.

According to one embodiment, front surface 112 includes a digital display 118 for displaying information. Digital display 118 could be any suitable display for performing such operation, such as a liquid crystal display (LCD), a light-emitting diode (LED) display, etc.

In some embodiments, front surface 112 includes an input element 120. Input element 120 may be operable to receive user inputs. For example, input element 120 may show icons for play, pause, fast forward, rewind, volume up, and/or volume down. When a user engages any of these elements by, e.g., touch or depression, electronic computing device 110 may respond by performing the requested function, such as increasing the volume of a song or other media.

In other embodiments, front surface 112 includes both digital display 118 and input element 120. Front surface 112 may include more than one digital display 118 and/or more than one input element 120. Digital display 118 and/or input element 120 need not be provided on front surface 112. Rather, they may be provided on any suitable surface. For example, one or more input elements 120 may be provided on a side surface 116.

Electronic computing device 110 also includes a receptacle connector 122. Receptacle connector 122 may be any suitable connector for establishing an electrical connection with other electronic devices, where the electrical connection is operable to communicate information between electronic computing device 110 and the electronic device coupled thereto via receptacle connector 122. In one embodiment, receptacle connector 122 is a 30-pin connector such as that described in U.S. Pat. No. 6,776,660, which is commonly assigned and incorporated herein by reference in its entirety for all purposes. In another embodiment, receptacle connector 122 is a magnetic connector such as that described in U.S. Pat. No. 7,311,526, which is commonly assigned and incorporated herein by reference in its entirety for all purposes. In other embodiments, however, receptacle connector 122 may be any other suitable connector for establishing an electrical connection, such as a USB connector, an audio connector (TRS connector, digital optical audio connector, etc.), a video connector (VGA, DVI, S-Video, etc.), an audio/video connector (RCA, HDMI, DisplayPort, etc.), a data connector (Firewire, eSATA, etc.), etc. In some of these embodiments, a shape of receptacle connector 122, shape of pins housed by receptacle connector 122, etc. may operate to provide a resistance force upon disengaging plugs from receptacle connector 122. In other embodiments, receptacle connector 122 may include one or more magnetic elements that operate to provide a resistance force upon disengaging receptacle connector 122 from plugs that have corresponding magnetic elements.

Receptacle connector 122 may be located on any surface of electronic computing device 110. In one embodiment, receptacle connector 122 is located on side surface 116. However, receptacle connector 122 may be located on front surface 112, rear surface 114, any other side surface 116, etc. In some embodiments, a number of same or different receptacle connectors 122 are provided on one or more surfaces of electronic computing device 110.

Electronic computing device 110 may also include one or more suitable processors and storage mediums (not shown). The storage medium may be any suitable tangible non-transitory computer readable medium, such as a random access memory (RAM), a read only memory (ROM), a magnetic medium such as a hard-drive or a floppy disk, a Flash memory device or SSD, or an optical medium such as a CD-ROM. The storage medium may store software code for performing any of the functions described in this application associated with electronic computing device 110. The software code may be stored in any suitable language, such as Java, Javascript, HTML, C, C++ or Perl using, for example, conventional or object-oriented techniques. The software code may be stored as a series of instructions or commands.

Removable user interface 150 is a user interface that can be selectively coupled with electronic computing device 110. Removable user interface 150 is further described with reference to FIGS. 2A to 9C. In general, however, removable user interface 150 is operable to both provide a user interface (e.g., for receiving user input and/or for displaying information) and removably attach electronic computing device 110 to an object.

Removable user interface generally includes a body having a plug (i.e., male connector) 152, a bend 153, and a user interface element 154, where user interface element 154 is carried by the body in a user interface area and may include one or more touch-sensitive regions (not shown). At each touch-sensitive region, a tactile feedback element 156 such as a bump or groove may be provided. Plug 152 is located at an engagement end of the body. Plug 152 is configured to mate with or mechanically engage (including a magnetic engagement) with receptacle connector 122 such that, when engaged in at least one orientation, an electrical connection is established between user interface element 154 and electronic computing device 110. Further, when plug 152 is engaged with receptacle connector 122, removable user interface 150 is operable to function as a clip. That is, upon engagement, removable user interface 150 is operable to removably attach electronic computing device 110 to an object, such as a person's clothes, backpack, bicycle, etc. Such functionality may be achieved by the provision of bend 153 which, in one embodiment, is located between the engagement end and the user interface area, and enables user interface element 154 to wrap around a portion of electronic device 110 when plug 152 is mated with connector 122.

In one embodiment, removable user interface 150 may be used to control electronic computing device 110. In this case, user interface element 154 may include touch-sensitive regions. Tactile feedback elements 156 may also be provided to enable a user to locate the touch-sensitive regions. Upon user-engagement with a tactile feedback element 156, electronic computing device 110 may be controlled to perform a particular function. In some embodiments, user interface element 154 may be transparent so that at least portions of digital display 118 are visible through user interface element 154. In this way, function-related information such as icons displayed on digital display 118 may be visible to the user through user interface element 154 so that the user may identify the function associated with each tactile feedback element 156.

In another embodiment, removable user interface 150 may be controlled by electronic computing device 110. In this case, user interface element 154 may include an electronic display. Electronic computing device 110 may then be operable to display information to the user via user interface element 154.

In other embodiments, removable user interface 150 may control electronic computing device 110 and be controlled by electronic computing device 110. For example, removable user interface 150 may be operable to control electronic computing device 110 in response to user-engagement with user interface element 154, and removable user interface 150 may be operable to display information communicated by electronic computing device 110.

Figure 2A:
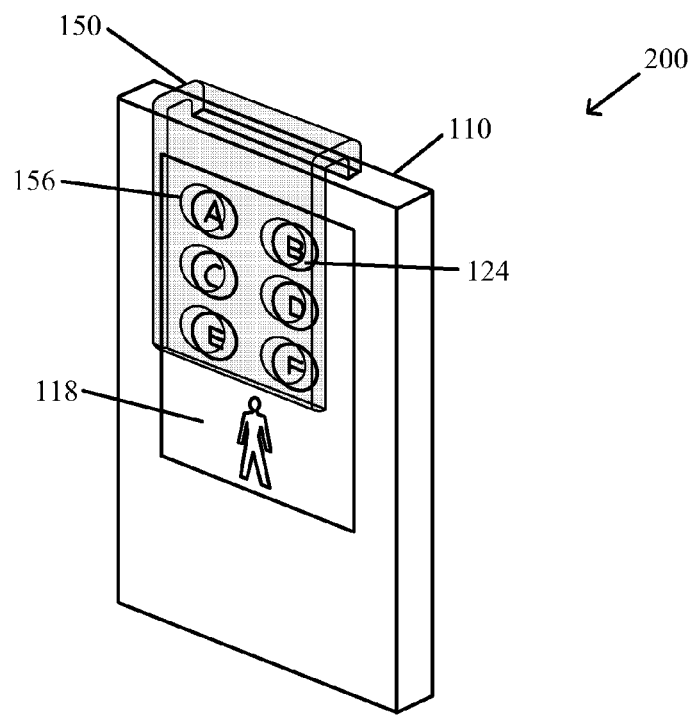
FIG. 2A illustrates a perspective view of a portable electronic system having a removable user interface coupled to an electronic computing device in a first orientation.

FIG. 2A illustrates a perspective view of a portable electronic system 200 having a removable user interface 150 coupled to an electronic computing device 110 in a first orientation. According to this embodiment, removable user interface 150 is coupled to electronic computing device 110 such that removable user interface 150 extends over at least a portion of digital display 118. Further, according to this embodiment and further discussed embodiments, input element 120 is not shown although such an element may be included.

Upon engaging removable user interface 150 with electronic computing device 110, electronic computing device 110 may detect the orientation in which removable user interface 150 is engaged with electronic computing device 110. In this case, electronic computing device 110 detects that removable user interface 150 is engaged such that removable user interface 150 is disposed over at least a portion of digital display 118. In some embodiments, removable user interface 150 may be disposed over the entire digital display 118. In other embodiments, there may be no digital display 118.

In response to such a detection, electronic computing device 110 may display icons at locations of digital display 118 that correspond to locations of touch-sensitive regions (e.g., where tactile feedback elements 156 are located). An icon may indicate to a user a functionality that electronic computing device 110 will perform in response to a user-selection of the tactile feedback element corresponding to the icon. For example, icon 124 ("B") may indicate a play function. In response to a user engagement with that corresponding tactile feedback element, i.e., the tactile feedback element located above or proximate to icon 124, electronic computing device 110 may perform the play function.

According to one embodiment, in response to detecting that removable user interface 150 is engaged such that removable user interface 150 is disposed over at least a portion of digital display 118, electronic computing device 110 may change an existing display of information. For example, before engagement of removable user interface 150, electronic computing device may display information such as an image (such as that shown on digital display 118 in FIG. 1) corresponding to a current song being played. In response to detecting engagement of removable user interface 150 such that removable user interface 150 is disposed over at least a portion of digital display 118, electronic computing device 110 may move the existing image to a different location of digital display 118. For example, electronic computing device 110 may move the image to a location of digital display 118 not interfered with by removable user interface 150, such as at a location below removable user interface 150 (such as that shown on digital display 118 in FIG. 2A). The image may be moved to provide space to display user-input information such as icons 124. In some embodiments, the existing display is entirely replaced by user-input information such as icons 124.

By engaging removable user interface 150 with electronic computing device 110 such that removable user interface 150 is disposed over at least a portion of digital display 118, digital display 118 may advantageously be protected from undesirable contact. Further, removable user interface 150 may advantageously provide a touch-sensitive user interface where such a user interface is otherwise not provided. In embodiments where removable user interface 150 includes tactile feedback elements 156, removable user interface 150 may advantageously assist user-input where such assistance is not otherwise provided. In embodiments where an electronic display is not provided on electronic computing device 110, removable user interface 150 may advantageously provide such a display. Further yet, by operating as a clip, removable user interface 150 may advantageously enable attachment to objects, where such attachment may not otherwise be provided.

Figure 2B:
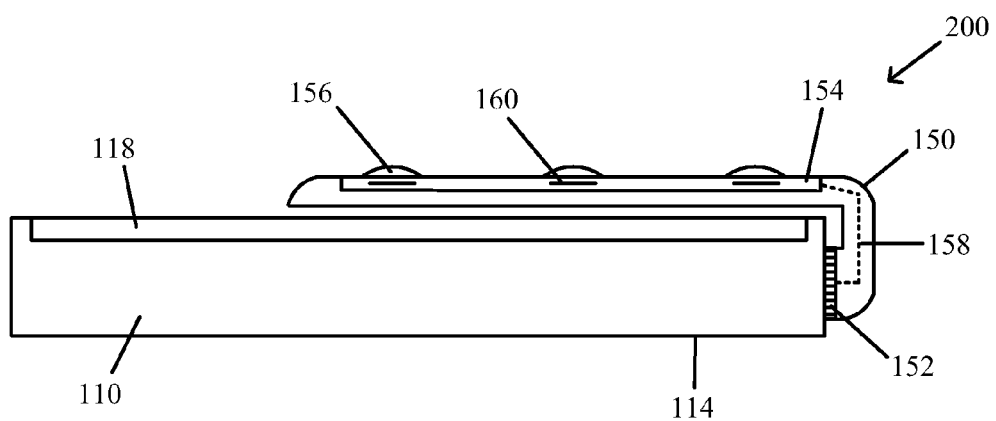
FIG. 2B illustrates a side view of the portable electronic system shown in FIG. 2A.

FIG. 2B illustrates a side view of the portable electronic system 200 shown in FIG. 2A. From the side view, it is apparent that removable user interface 150 may be disposed over only a portion of digital display 118. It is further apparent that user interface element 154 may include one or more touch-sensitive regions 160.

As shown in FIG. 2B, portable electronic system 200 includes a conductive element 158 extending at least between user interface element 154 and plug 152. Conductive element 158 is for communicating at least one electrical signal between user interface element 154 and plug 152. Conductive element 158 may be any suitable element for conducting electrical signals. For example, conductive element 158 may be made of metal, metal alloys, etc., including, e.g., copper, aluminum, nickel, silver, gold, etc.

Conductive element 158 may have any suitable arrangement, depending on the operation of user interface element 154 (e.g., display information, receive user input, etc.) and depending on the type of technology used in user interface element 154 (e.g., capacitive touch pad, LCD, etc.). In one embodiment, conductive element 158 may include a plurality of conductive traces extending within removable user interface 150 from user interface element 154 to plug 152. The conductive traces may extend all the way to touch-sensitive regions 160. Accordingly, user-engagement with touch-sensitive regions 160 may result in electrical signals being communicated to electronic computing device 110 via plug 152, where the electrical signals indicate a location on user interface element 154 that a user touches. In another embodiment, user interface element 154 may include an electronic display, and conductive element 158 may communicate electrical signals from electronic computing device 110 indicating information to be displayed on user interface element 154.

Figure 3A:
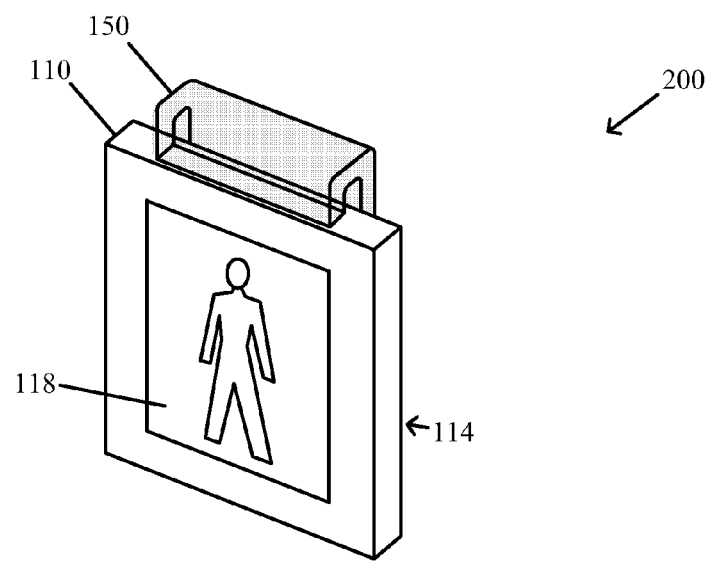
FIG. 3A illustrates a perspective view of a portable electronic system having a removable user interface coupled to an electronic computing device in a second orientation.

FIG. 3A illustrates a perspective view of a portable electronic system 200 having a removable user interface 150 coupled to an electronic computing device 110 in a second orientation. According to this embodiment, removable user interface 150 is coupled to electronic computing device 110 such that removable user interface 150 extends over a surface of electronic computing device 110 opposite a display surface. For example, removable user interface 150 may extend over rear surface 114.

Upon engaging removable user interface 150 with electronic computing device 110, electronic computing device 110 may detect the orientation in which removable user interface 150 is engaged with electronic computing device 110. In this case, electronic computing device 110 detects that removable user interface 150 is engaged such that removable user interface 150 is disposed over a surface other than one including digital display 118; for example, rear surface 114. In some embodiments, removable user interface 150 may be disposed over the entire rear surface 114.

In one embodiment, removable user interface 150 may still be operable to control electronic computing device 110 as previously discussed with reference to FIG. 2A. In other embodiments, removable user interface 150 may now be inoperable to control electronic computing device 110. Similarly, in this orientation, electronic computing device 110 may or may not be operable to display information via removable user interface 150.

According to one embodiment, in this orientation, electronic computing device 110 may continue to display full-screen information such as that discussed with reference to FIG. 1. In other embodiments, existing display information may be moved, resized, or entirely removed, and user-input information such as icons 124 may be displayed, similar to the functionality discussed with reference to FIG. 2A. Also similar to the discussion with reference to FIG. 2A, icons 124 may be displayed in locations corresponding to locations of touch-sensitive regions (and/or tactile feedback elements 156) of removable user interface 150.

By engaging removable user interface 150 with electronic computing device 110 such that removable user interface 150 is disposed over a surface other than one including digital display 118, removable user interface 150 may advantageously enable attachment to objects without interfering with digital display 118. Further, by providing tactile feedback elements 156, removable user interface 150 may advantageously assist user-input where such assistance is not otherwise provided.

Figure 3B:
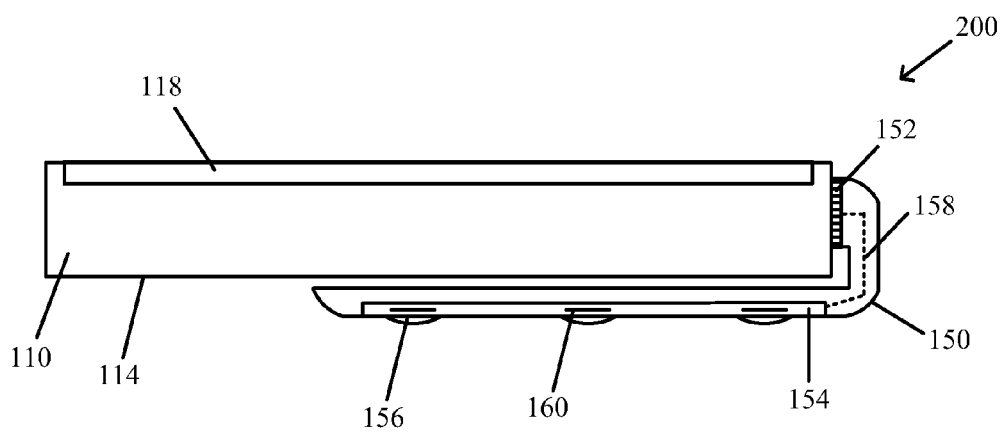
FIG. 3B illustrates a side view of the portable electronic system shown in FIG. 3A.

FIG. 3B illustrates a side view of the portable electronic system 200 shown in FIG. 3A. From the side view, it is apparent that removable user interface 150 may be disposed over only a portion of rear surface 114. It is further apparent that user interface element 154 may include one or more touch-sensitive regions 160 as discussed with reference to FIG. 2B.

In some embodiments, plug 152 and receptacle connector 122 may be adapted to mate in only one orientation. For example, with reference to FIGS. 2A and 2B, they may be adapted to mate in an orientation where removable user interface 150 is disposed over a surface including digital display 118. For another example, with reference to FIGS. 3A and 3B, they may be adapted to mate in an orientation where removable user interface 150 is disposed over a surface other than one including digital display 118, such as rear surface 114.

Figure 4A:
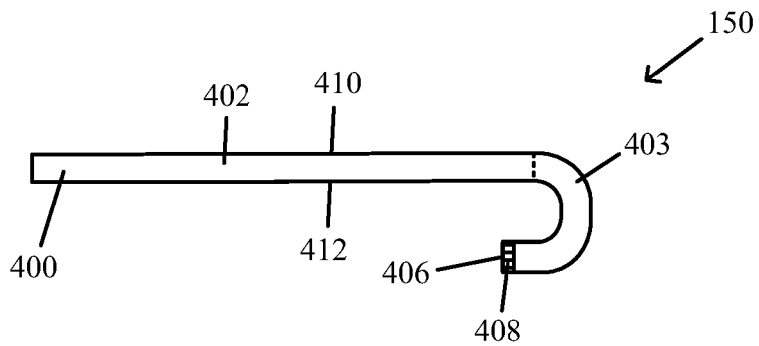
FIG. 4A shows a removable user interface having a side profile according to a first embodiment.

FIGS. 4A to 4E show side views of removable user interface 150 having different shapes according to various embodiments. FIG. 4A shows a removable user interface 150 having a side profile according to a first embodiment. Removable user interface 150 according to this embodiment includes a body 400. Body 400 may be made of any suitable solid material. For example, body 400 may be made of metal, ceramic, polymers, composite materials, etc. Body 400 may also include suitable materials for providing an electronic display and/or touch pad. Some examples of body 400 and its relation to user interface materials are discussed with reference to FIGS. 9A to 9C. In this embodiment, body 400 may be user interface element 154, may be separate from user interface element 154, or may include user interface element 154, where user interface element 154 is located at a user interface area of body 400.

Body 400 includes an interface portion 402, a bend portion 403, and an engagement end 406. Interface portion 402 is for providing a user interface, and as such may include user interface element 154. Bend portion 403 is for enabling interface portion 402 to wrap around a portion of an electronic device when body 400 is coupled to the electronic device. Engagement end 406 is for coupling removable user interface 150 to electronic computing device 110. A plug 408 (corresponding to plug 152) is located at engagement end 406, such that plug 408 may engage receptacle connector 122.

Interface portion 402 includes a number of surfaces. For example, interface portion 402 includes a top surface 410 and a bottom surface 412. Upon engaging removable user interface 150 with electronic computing device 110, top surface 410 may be exposed to a user so as to receive user input, and bottom surface 412 may face a surface (e.g., top surface 112) of electronic computing device 110.

Bend portion 403 may be any suitable portion for arranging interface portion 402 substantially parallel to a surface (e.g., front surface 112) of electronic computing device 110 when removable user interface 150 is engaged with electronic computing device 110. For example, as shown in FIG. 4A, bend portion 403 may be curved at an angle of approximately 180 degrees such that interface portion 402 is substantially parallel to plug 406. Bend portion 403 may be curved at other suitable angles that provide such a parallel arrangement upon coupling; for example, it may be curved at an angle of 175 degrees, 178 degrees, 182 degrees, 185 degrees, or in a range from 175 degrees to 185 degrees, or greater than 185 degrees or less than 175 degrees.

Figure 4B:
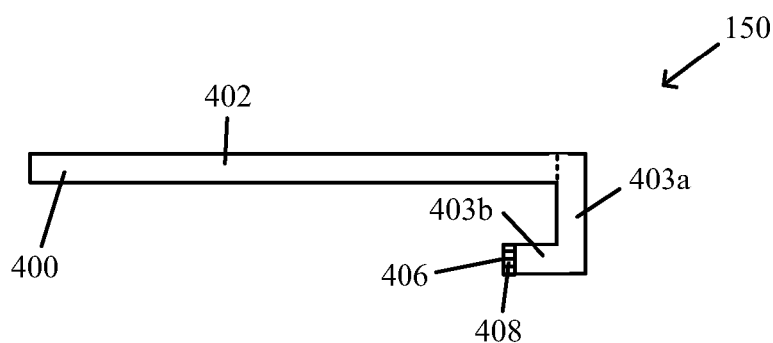
FIG. 4B shows a removable user interface having a side profile according to a second embodiment.

FIG. 4B shows a removable user interface 150 having a side profile according to a second embodiment. Removable user interface 150 according to this embodiment is similar to that discussed with reference to FIG. 4A, with the exception of bend portion 403.

Bend portion 403 according to this embodiment is square-shaped rather than curved. That is, bend portion 403 includes a first portion 403a arranged substantially perpendicular to interface portion 402, and a second portion 403b arranged substantially perpendicular to first portion 404a. As a result of providing plug 408 on second portion 403b, interface portion 402 may be oriented substantially parallel to a surface (e.g., front surface 112) of electronic computing device 110 when removable user interface 150 is engaged with electronic computing device 110.

Figure 4C:
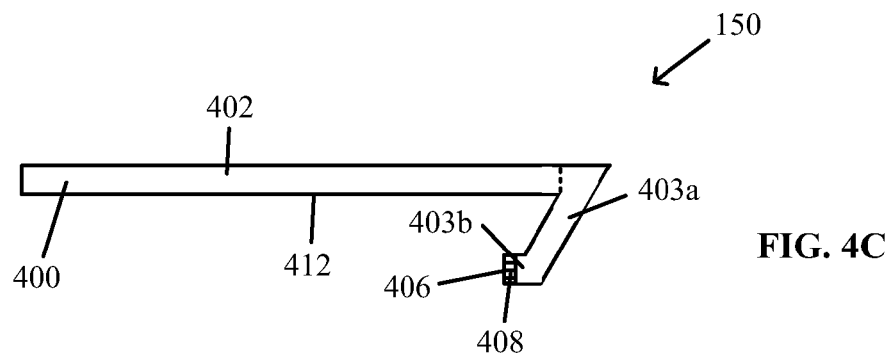
FIG. 4C shows a removable user interface having a side profile according to a third embodiment.

FIG. 4C shows a removable user interface 150 having a side profile according to a third embodiment. Removable user interface 150 according to this embodiment is similar to that discussed with reference to FIG. 4B, with the exception of first portion 403a.

First portion 403a of bend portion 403 according to this embodiment is at an acute angle with respect to bottom surface 412. Second portion 403b is at an obtuse angle with respect to first portion 403a. Any suitable angles may be used so that interface portion 402 is oriented substantially parallel to a surface (e.g., front surface 112) of electronic computing device 110 when removable user interface 150 is engaged with electronic computing device 110. For example, the acute angle may be 45 degrees, and the obtuse angle may be 135 degrees. Any other combinations that sum to approximately 180 degrees (or 175 degrees, 178 degrees, etc.) may be used, and one skilled in the art could readily derive such combinations.

Figure 4D:
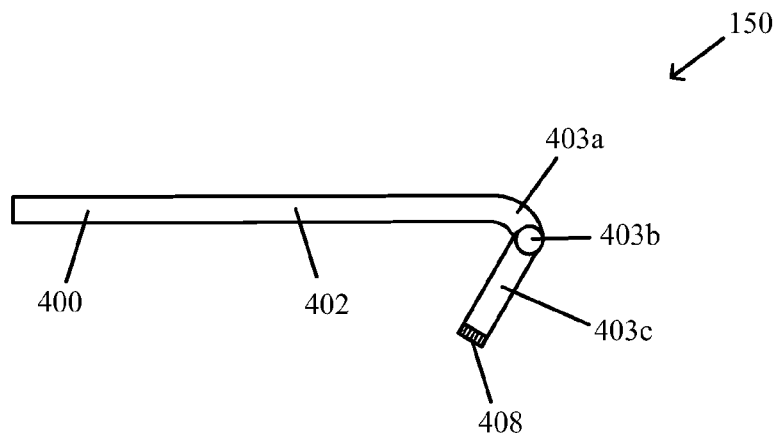
FIG. 4D shows a removable user interface having a side profile according to a fourth embodiment.

FIG. 4D shows a removable user interface 150 having a side profile according to a fourth embodiment. Removable user interface 150 according to this embodiment is similar to that discussed with reference to FIG. 4A, except that in this embodiment bend portion 403 includes a first portion 403a, a rotatable element 403b, and a second portion 403c. First portion 403a in this embodiment is a curve of approximately 90 degrees. Rotatable element 403b rotatably couples first portion 403a to second portion 403c and may be any suitable element operable to perform such coupling. For example, rotatable element 403b may be a hinge. Accordingly, by its combination of elements, bend portion 403 is operable to orient interface portion 402 substantially parallel to a surface (e.g., front surface 112) of electronic computing device 110 when removable user interface 150 is engaged with electronic computing device 110.

Any suitable combination of curved portions, straight portions, and rotatable elements may be employed so as to orient interface portion 402 substantially parallel to a surface of electronic computing device 110. For example, first portion 403a may have any suitable angle of curvature, such as 85 degrees, 95 degrees, or in a range from 85 degrees to 95 degrees, or greater than 95 degrees or less than 85 degrees. For another example, second portion 403c may also include one or more curves at any suitable angle. For yet another example, first portion 403a may be straight or include straight portions. One skilled in the art would recognize the various combinations of curved and straight portions possible and the suitable amount of curvature required, and all such combinations are within the scope of the embodiments described herein.

Further, in one embodiment, bend portion 403 is operable to apply a tension force between interface portion 402 and engagement end 406. For example, rotatable element 403b may be or may include a spring. Accordingly, with reference to FIG. 3B, when plug 408 is connected to receptacle connector 122, interface portion 402 may apply a force toward rear surface 114.

Figure 4E:
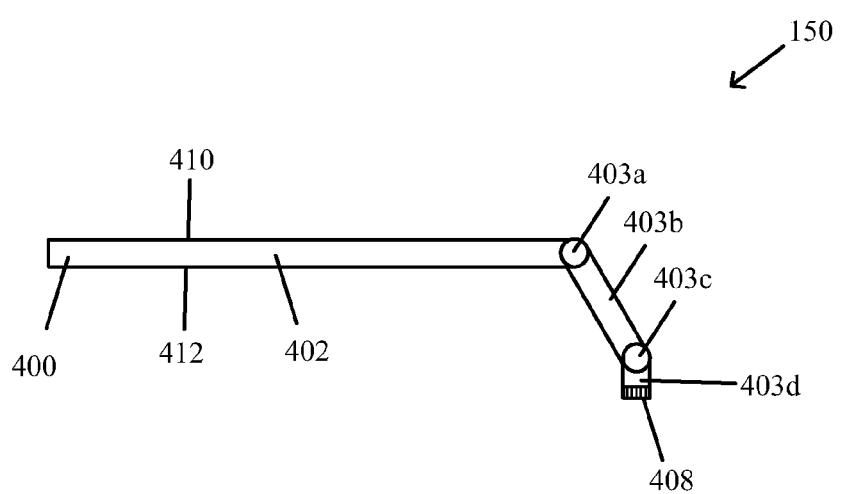
FIG. 4E shows a removable user interface having a side profile according to a fifth embodiment.

FIG. 4E shows a removable user interface 150 having a side profile according to a fifth embodiment. Removable user interface 150 according to this embodiment is similar to that discussed with reference to FIG. 4D, except that in this embodiment bend portion 403 includes multiple rotatable elements. In this case, bend portion 403 includes a first rotatable element 403a, a first portion 403b, a second rotatable element 403c, and a second portion 403d. Similar to the embodiments discussed with reference to FIG. 4D, any suitable combination of curved portions, straight portions, and rotatable elements may be employed so as to orient interface portion 402 substantially parallel to a surface of electronic computing device 110. This may include employing curves within one or more of first portion 403b and second portion 403d.

First rotatable element 403a and second rotatable element 403b may have the same or different angles of rotation. In one embodiment, first rotatable element 403a and second rotatable element 403b are configured such that interface portion 402 is nearly 360 degrees rotatable about plug 408. As a result, in a first orientation, bottom surface 412 may be arranged to face front surface 112 of electronic computing device 110, and in a second orientation, top surface 410 may be arranged to face rear surface 114 of electronic computing device.

Although the embodiments discussed with reference to FIGS. 4A to 4E clearly delineate interface portion 402 from bend portion 403, in some embodiments such a delineation is not necessary. That is, a portion of interface portion 402 may extend into bend portion 403. For example, with reference to FIG. 4A, a portion of user interface element 154 may extend at least partially around the curved surface of bend portion 403. For another example, with reference to FIG. 4E, a portion of user interface element 154 may be located on or located in or extend to at least one of first portion 403b and second portion 403d.

Figure 5A:
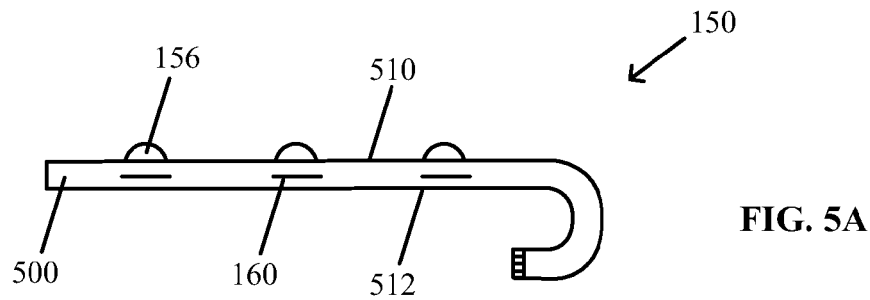
FIG. 5A shows a removable user interface having tactile feedback elements according to a first embodiment.

FIGS. 5A to 5D show side views of removable user interface 150 having different types of tactile feedback elements according to various embodiments. FIG. 5A shows a removable user interface 150 having tactile feedback elements 156 according to a first embodiment. Removable user interface includes body 500, top surface 510, and bottom surface 512, similar to those discussed with reference to FIGS. 4A to 4E.

According to this embodiment, removable user interface 150 includes one tactile feedback element 156 for each touch-sensitive region 160. Each tactile feedback element 156 is located directly above a corresponding touch-sensitive region 160. The tactile feedback element 156 protrudes from top surface 510 of body 500. Tactile feedback element 156 may have any suitable shape, including square, rectangular, circular, oval, etc. Tactile feedback element 156 may protrude from top surface 510 any amount sufficient to be recognizable by touch. For example, tactile feedback element 156 may protrude by 0.8 mm, 0.9 mm, 1 mm, 1.1 mm, 1.2 mm, in a range from 0.75 mm to 1.25 mm, or an amount less than 0.75 mm or greater than 1.25 mm.

In one embodiment, each tactile feedback element 156 may be formed from material separate from body 150, and as such may subsequently be bonded to top surface 510. In other embodiments, the tactile feedback elements 156 are formed as part of body 500, and thus may be formed by top surface 510. Tactile feedback elements 156 may be made of any suitable material. For example, they may be made of a solid material such as glass, ceramic, plastic, etc.

According to one embodiment, one or more tactile feedback elements 156 may operate to magnify images. For example, when removable user interface 150 is engaged with electronic computing device 110 such that user interface element 154 extends over at least a portion of digital display 118, tactile feedback elements 156 may be configured to enlarge information (such as icons) displayed on digital display 118.

Figure 5B:
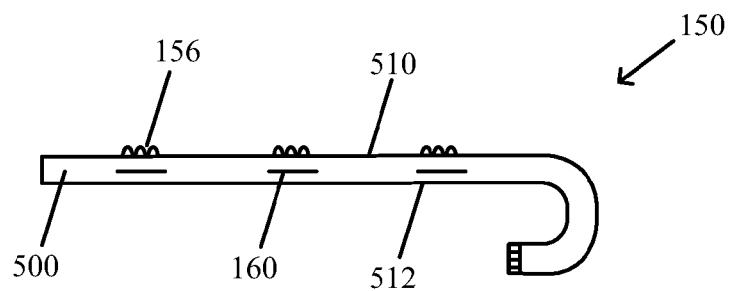
FIG. 5B shows a removable user interface having tactile feedback elements according to a second embodiment.

FIG. 5B shows a removable user interface 150 having tactile feedback elements according to a second embodiment. This embodiment is similar to that discussed above with reference to FIG. 5A. However, in this embodiment, a plurality of tactile feedback elements 156 are grouped together and correspond to a single touch-sensitive region 160. The plurality of tactile feedback elements 156 corresponding to a single touch-sensitive region 160 may be grouped in any suitable shape, such as a circle, square, rectangle, oval, etc., and each may have any suitable shape, similar to those discussed above with reference to FIG. 5A. Further, each tactile feedback element in the plurality of feedback elements 156 may protrude from top surface 112 any suitable amount, such as 0.1 mm, 0.2 mm, 0.3 mm, in a range from 0.1 mm to 0.3 mm, less than 0.1 mm, or greater than 0.3 mm. The groupings of tactile feedback elements 156 may have the same or different shapes, and numerous variations would be recognized by those skilled in the art.

Figure 5C:
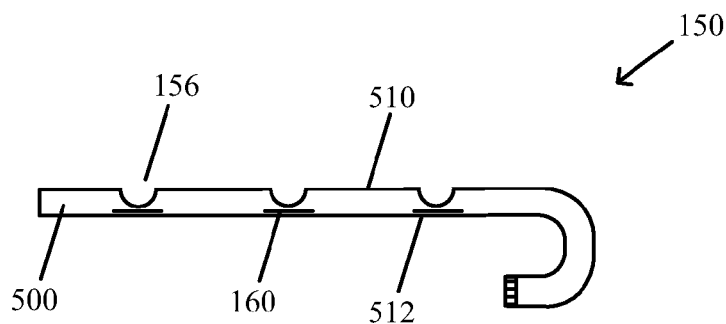
FIG. 5C shows a removable user interface having tactile feedback elements according to a third embodiment.

FIG. 5C shows a removable user interface 150 having tactile feedback elements 156 according to a third embodiment. This embodiment is similar to that discussed above with reference to FIG. 5A. However, in this embodiment, tactile feedback elements 156 are cutouts from body 500. For example, tactile feedback elements 156 may be cutout from top surface 510. Similar to the embodiment discussed above with reference to FIG. 5A, the cutouts may be cut out to any suitable depth, and have any suitable shape. Similar to the embodiment discussed above with reference to FIG. 5B, a plurality of cutouts may be provided for each touch-sensitive region 160, where the plurality has any suitable depth and shape.

Figure 5D:
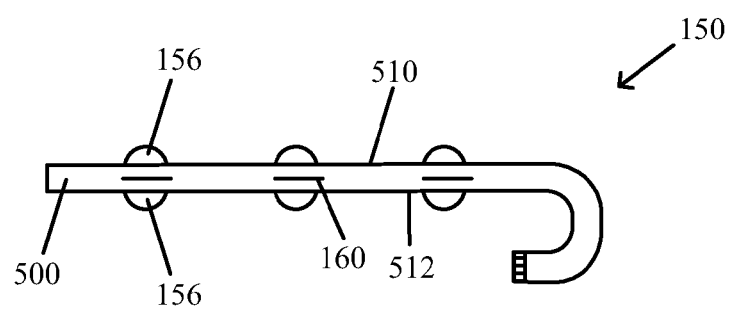
FIG. 5D shows a removable user interface having tactile feedback elements according to a fourth embodiment.

FIG. 5D shows a removable user interface 150 having tactile feedback elements according to a fourth embodiment. This embodiment is similar to that discussed above with reference to FIG. 5A. However, in this embodiment, tactile feedback elements 156 are provided on both top surface 510 and bottom surface 512. The tactile feedback elements 156 located on bottom surface 512 may be arranged below corresponding touch-sensitive regions 160. In some embodiments, tactile feedback elements 156 on top surface 510 may be any of those discussed with reference to FIGS. 5A to 5C.

Tactile feedback elements 156 located on bottom surface 512 may provide one or more functions. For example, where body 500 includes one or more rotatable elements such as those discussed with reference to FIGS. 4D and 4E, tactile feedback elements 156 located on bottom surface 512 may be used to provide feedback to a user when removable user interface 150 is rotated. For another example, such tactile feedback elements may provide stops to prevent body 500 from directly contacting a surface of electronic computing device 110. In such a case, tactile feedback elements 156 may be made of material that is softer than the material which electronic display 118 is made of. For example, they may be made of at least one of silicon, rubber, cloth, soft plastic, etc.

Although FIGS. 5A to 5D show various embodiments that include tactile feedback elements 156, in some embodiments, removable user interface 150 does not have any tactile feedback elements 156.

Figure 6A:
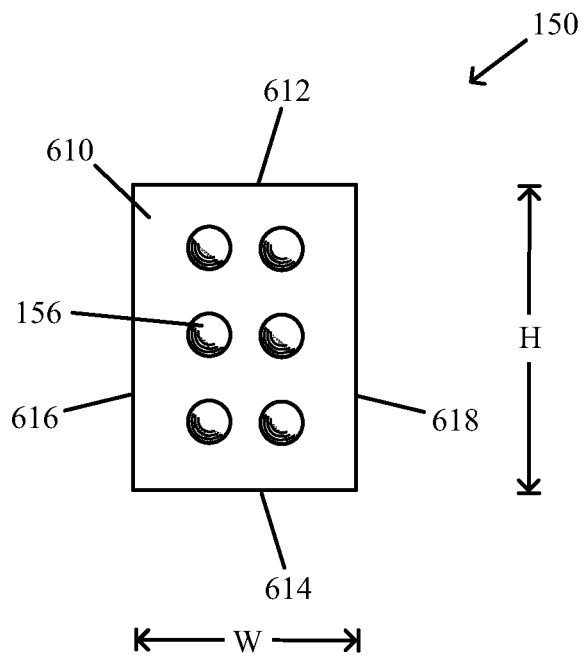
FIG. 6A shows a top surface of a removable user interface having a according to a first embodiment.

FIGS. 6A to 6D show top views of removable user interface 150 having different shapes according to various embodiments. FIG. 6A shows a top surface 610 of a removable user interface 150 according to a first embodiment. Top surface 610 is similar to that previously discussed with reference to FIGS. 4A to 5D.

Top surface includes a first end 612 and a second end 614. In one embodiment, first end 612 is an end nearest plug 152, and second end 614 is opposite first end 612. In another embodiment, second end 614 is an end nearest plug 152, and first end 612 is opposite second end 614. Top surface also includes a first side surface 616 and a second side surface 618 arranged opposite one another.

In this embodiment, top surface 610 has a square or rectangular shape. Accordingly, first end 612 and second end 614 are arranged parallel to one another, as are first side surface 616 and second side surface 618. A width W of top surface 610 and a height H of top surface 610 may be any suitable width and length. For example, the width and height may be 30 mm, 35 mm, 40 mm, or in a range from 30 to 40 mm, or less than 30 mm, or greater than 40 mm. The width and height may be the same or different from one another.

Tactile feedback elements 156 may have any suitable shape, as previously discussed, and may have any suitable size. For example, they may each have a diameter of 5 mm, 7.5 mm, 10 mm, or in a range from 5 mm to 10 mm, or less than 5 mm, or greater than 10 mm. The number of tactile feedback elements provided may be any suitable number. For example, one, two, or greater than two may be provided. Tactile feedback elements 156 may be arranged in any suitable pattern. In this embodiment, two columns of three tactile feedback elements 156 are provided.

Figure 6B:
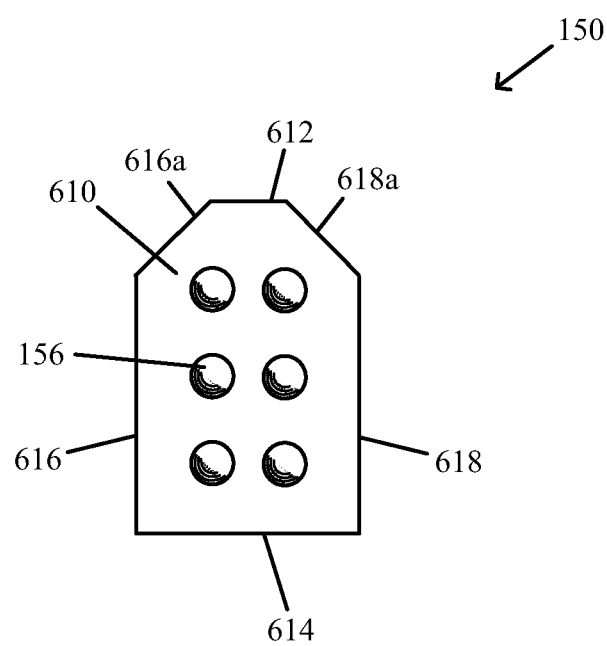
FIG. 6B shows a top surface of a removable user interface according to a second embodiment.

FIG. 6B shows a top surface 610 of a removable user interface 150 according to a second embodiment. This embodiment is similar to that discussed with reference to FIG. 6A. However, in this embodiment, first side surface 616 and second side surface 618 include a first cutout portion 616a and a second cutout portion 618a, respectively. Any number of portions may be cutout from one or more of the side surfaces, and they may be cutout at any suitable angle or in any suitable shape.

Figure 6C:
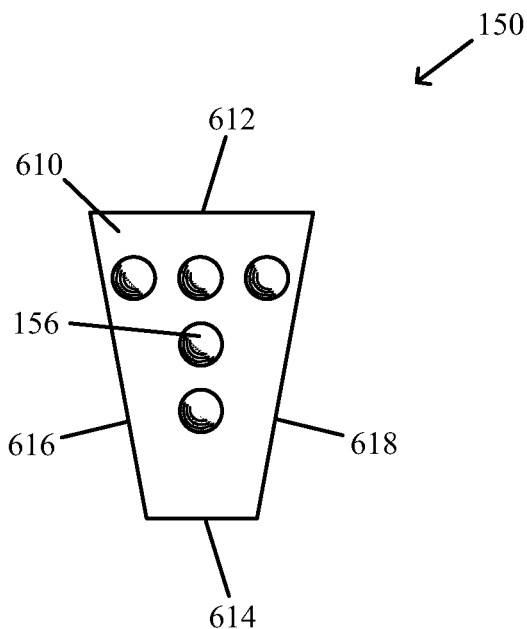
FIG. 6C shows a top surface of a removable user interface according to a third embodiment.

FIG. 6C shows a top surface 610 of a removable user interface 150 according to a third embodiment. This embodiment is similar to that discussed above with reference to FIG. 6A. However, in this embodiment, first side surface 616 and second side surface 618 are tapered from first end 612 to second end 614. One or more of the side surfaces may be tapered, and they may be tapered at any suitable angle.

Figure 6D:
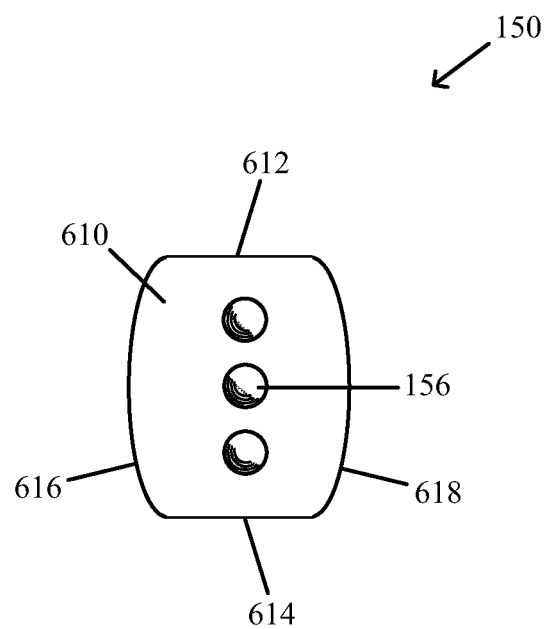
FIG. 6D shows a top surface of a removable user interface according to a fourth embodiment.

FIG. 6D shows a top surface 610 of a removable user interface 150 according to a fourth embodiment. This embodiment is similar to that discussed above with reference to FIG. 6A. However, in this embodiment, first side surface 616 and second side surface 618 are curved between first end 612 and second end 614. One or more of the side surfaces may be curved, and they may be curved to any suitable degree.

Numerous variations on the shape of top surface 610, number of tactile feedback elements 156, and arrangement of tactile feedback elements 156 would be recognized by one skilled in the art, and all such variations are within the scope of the embodiments described herein.

Figure 7A:
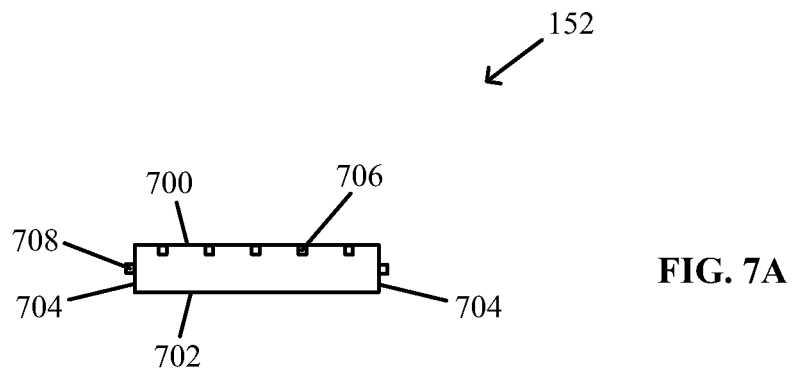
FIG. 7A shows a cross-section of a plug according to a first embodiment.
Figure 7B:
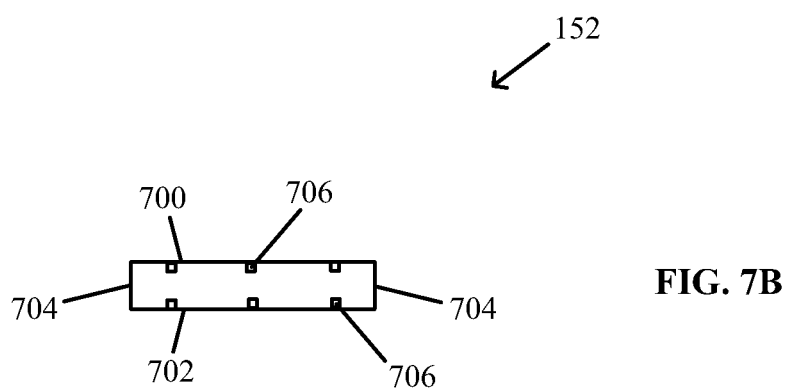
FIG. 7B shows a cross-section of a plug according to a second embodiment.
Figure 7C:
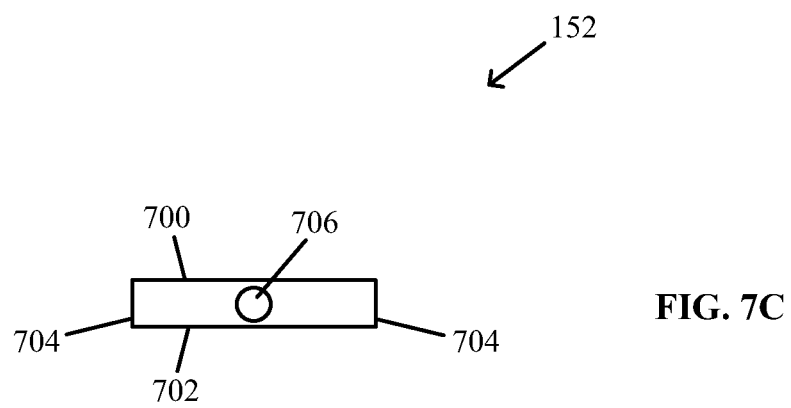
FIG. 7C shows a cross-section of a plug according to a third embodiment.

FIGS. 7A to 7C show a cross-section of plug 152 according to various embodiments. FIG. 7A shows a cross-section of plug 152 according to a first embodiment. Plug 152 has any shape, surfaces, and size suitable to engage and mate with a receptacle connector such as receptacle connector 122. For example, plug 152 may be a 30-pin connector, a magnetic connector, a USB connector, an audio connector (TRS connector, digital optical audio connector, etc.), a video connector (VGA, DVI, S-Video, etc.), an audio/video connector (RCA, HDMI, DisplayPort, etc.), a data connector (Firewire, eSATA, etc.), etc. In some of these embodiments, a shape of plug 152, shape of pins housed by plug 152, provision of locking mechanisms in plug 152, etc. may operate to provide a resistance force upon disengaging plug 152 from receptacle connector 122. In other embodiments, plug 152 may include one or more magnetic elements that operate to provide a resistance force upon disengaging plug 152 from receptacle connectors that have corresponding magnetic elements.

In this embodiment, plug 152 has a plurality of surfaces including a top surface 700, a bottom surface 702, and side surfaces 704. Top surface 700 is arranged opposite bottom surface 702, and side surfaces 704 are arranged opposite each other.

Plug 152 includes one or more contact electrodes 706 arranged on top surface 700. Contact electrodes 706 may have any suitable shape and size for engaging with receptacle electrodes provided in receptacle connector 122. For example, contact electrodes 706 may be in the shape of a pin. Contact electrodes 706 may be made of any suitable conductive material, including one or more metals or metal alloys such as copper, aluminum, nickel, tin, magnesium, gold, etc.

Contact electrodes 706 are mechanically and electrically coupled to conductive element 158. Accordingly, upon engagement with receptacle connector 122, contact electrodes 706 are operable to communicate electrical signals between electronic computing device 110 and user interface element 154 via conductive element 158.

Plug 152 may include one or more securing elements 708. Securing elements 708 may have any shape, surfaces, and size suitable to lock plug 152 to receptacle connector 122 upon engagement. Plug 152 may be released from receptacle connector 122 in any suitable fashion such as, e.g., user-activation of a release pin (not shown). In this embodiment, securing elements 708 are provided on side surfaces 704, however, they may be provided on any suitable surface of plug 152.

FIG. 7B shows a cross-section of plug 152 according to a second embodiment. Plug 152 according to this embodiment is similar to that discussed with reference to FIG. 7A. However, in this embodiment, contact electrodes 706 are also provided on bottom surface 702 of plug 152. Some functionality associated with providing contact electrodes 706 on top surface 700 and/or bottom surface 702 of plug 152 is further discussed with reference to FIGS. 8A and 8B, and FIGS. 11A and 11B.

FIG. 7C shows a cross-section of plug 152 according to a third embodiment. According to this embodiment, plug 152 includes electrode 706 which is a TRS connector (i.e., an audio jack) as well as various surfaces such as those discussed with reference to FIG. 7A. TRS connector 706 may extend from plug 152 further than other surfaces. With reference to FIG. 4A, TRS connector 706 may extend from engagement end 406 by a predefined distance sufficient to enable the TRS connector 706 to fully engage and mate with receptacle connector 122. For example, TRS connector 706 may extend from engagement end 406 by 2.5 mm, 3 mm, 3.5 mm, 4 mm, or in a range from 2.5 mm to 4 mm, or greater than 4 mm. In this case, the other surfaces of plug 152 (such as top surface 700, bottom surface 702, and side surfaces 704) are flush with engagement end 406. Accordingly, TRS connector 706 extends from those other surfaces by the aforementioned amounts. Similar to the embodiment discussed above with reference to FIG. 7A, TRS connector 706 is mechanically and electrically coupled to conductive element 158.

Figure 8A:
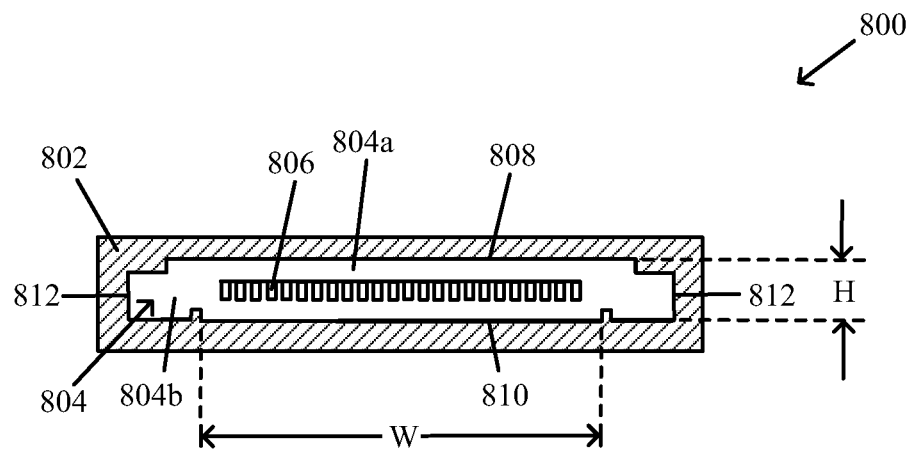
FIG. 8A shows a cross section of a receptacle connector according to an embodiment.
Figure 8B:
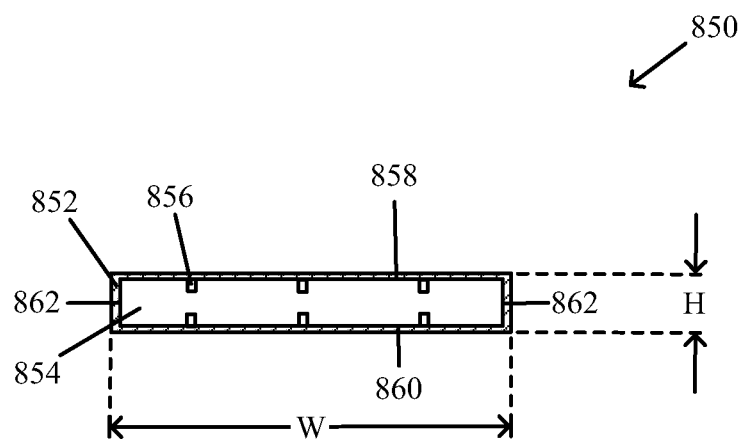
FIG. 8B shows a cross section of a plug suitable to connect with the receptacle connector of FIG. 8A in multiple orientations.

FIGS. 8A and 8B show a receptacle connector 800 and a plug 850 suitable for bi-orientation mating according to an embodiment. Bi-orientation mating refers to the ability of plug 850 to connect to receptacle connector 800 in two orientations rather than a single orientation.

FIG. 8A shows a cross section of a receptacle connector 800 according to an embodiment. Receptacle connector 800 may correspond to receptacle connector 122 previously discussed with reference to FIG. 1. Receptacle connector 800 is any suitable connector for establishing an electrical connection as previously discussed with reference to FIG. 1. In this embodiment, receptacle connector includes a housing 802. Housing 802 has an interior cavity 804, in which one or more receptacle electrodes 806 are provided. Housing 802 includes a number of surfaces defining interior cavity 804, such as an upper surface 808, a lower surface 810, and side surfaces 812.

Receptacle electrodes 806 may have any suitable shape and size for engaging with contact electrodes provided in plug 408. For example, receptacle electrodes 806 may be in the shape of a pin. Receptacle electrodes 806 may be made of any suitable conductive material, including one or more metals or metal alloys such as copper, aluminum, nickel, tin, magnesium, gold, etc., and are operable to communicate electrical signals between electronic computing device 110 and other devices such as removable user interface 150.

Side surfaces 812 are shaped so that corresponding plugs may only mate with receptacle connector 800 in a single orientation. For example, a corresponding plug generally has side surfaces corresponding to the shape of side surfaces 812. In this fashion, pins provided in the typical corresponding plug necessarily contact receptacle electrodes 806 upon engagement in only one orientation.

Interior cavity 804 includes a first portion 804a that is in the shape of a rectangle having a width W and height H, and a second portion 804b that includes portions of cavity excluded by first portion 814. First portion 804a is defined in part by upper surface 808 and lower surface 810. Second portion 804b is defined in part by side surfaces 812. Second portion 804b generally serves to force a single-orientation connection since the shape of second portion 804b is not symmetrical about a horizontal axis extending along width W. However, first portion 804a may facilitate a dual-orientation connection since first portion 804a is in the shape of a rectangle, and thus has a symmetrical shape about the horizontal axis.

FIG. 8B shows a cross section of a plug 850 suitable to connect with receptacle connector 800 of FIG. 8A in two orientations. Plug 850 is identical to that discussed with reference to FIG. 7B, and includes a housing 852. Housing 852 has an interior cavity 854, in which one or more plug electrodes 856 are provided. Housing 852 includes a number of surfaces defining interior cavity 854, such as an upper surface 858, a lower surface 860, and side surfaces 862.

Plug electrodes 856 may have any suitable shape and size for engaging with receptacle electrodes provided in receptacle connector 800, may be made of any suitable conductive material, and are operable to communicate electrical signals between removable user interface 150 and other devices such as electronic computing device 110.

Body 852 is shaped so as to mate with receptacle connector 800 in two orientations. In the first orientation, top surface 858 contacts or is proximate to upper surface 808. In the second orientation, top surface 858 contacts or is proximate to lower surface 810. Body 852 has the same symmetrical shape as the first portion 804a of cavity 804. That is, body 852 has a rectangular shape having a width W and a height H. Further, body 852 defines cavity 854 such that receptacle electrodes 806 can enter into cavity 854 upon engagement in either orientation. In this embodiment, electrodes 856 are provided on or proximate to both top surface 858 and bottom surface 860, such that at least some of electrodes 856 will contact receptacle electrodes 806 upon engagement in either orientation.

Accordingly, plug 850 is suitable to connect with receptacle connector 800 in multiple orientations. In the first orientation, contact electrodes 856 provided on or adjacent to bottom surface 860 contact receptacle electrodes 806 upon engaging plug 850 with connector 800. In the second orientation, contact electrodes 856 provided on or adjacent to top surface 858 contact receptacle electrodes 806 upon engaging plug 850 with connector.

In other embodiments, plug 850 may include contact electrodes 856 on only one surface, such as on top surface 858 such as that discussed with reference to FIG. 7A. In such a case, in the first orientation, contact electrodes 856 would not contact receptacle electrodes 806 upon engaging plug 850 with connector 800, and in the second orientation contact electrodes 856 would contact receptacle electrodes 806 upon engaging plug 850 with connector 800.

Receptacle connector 800 and plug 850 may be designed to engage one another in a number of different ways for multiple orientation engagement, and may even be designed to engage one another in more than two orientations. For example, receptacle connector 800 may have a square-shaped cavity 804 rather than rectangular, with electrodes arranged on one or more sides of the connector defining the cavity. Plug 850 may then have a corresponding square shape, with electrodes arranged on one or more sides of the plug defining the cavity. In this fashion, up to four different connector orientations may be possible. One skilled in the art may readily derive various connector and plug shapes for various numbers of orientations, and all are within the scope of the embodiments disclosed herein.

Figure 9A:
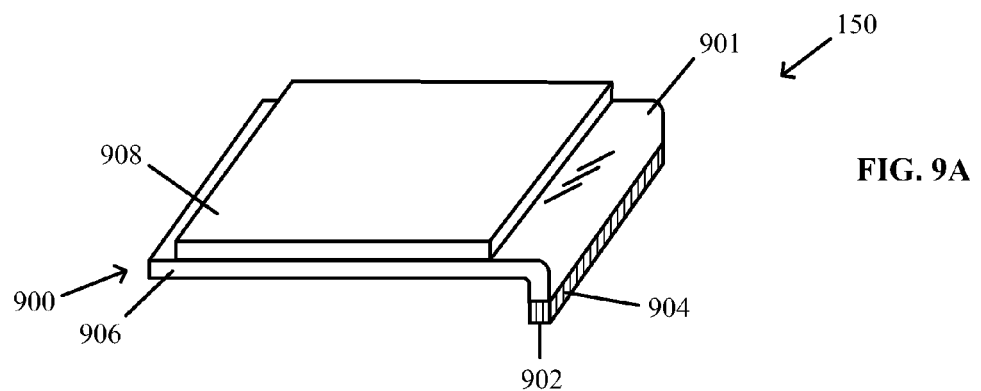
FIG. 9A shows a profile view of a removable user interface according to a first embodiment.
Figure 9B:
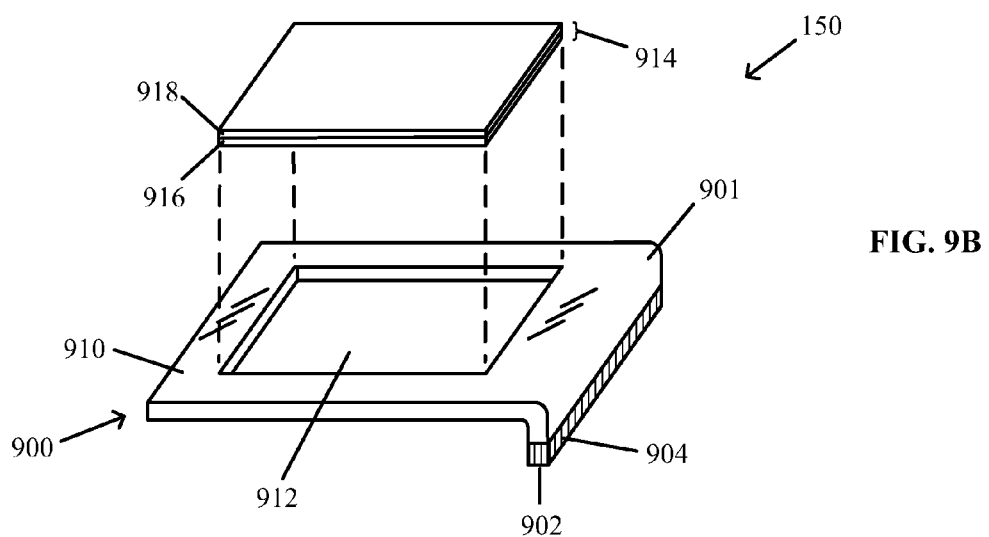
FIG. 9B shows a profile view of a removable user interface according to a second embodiment.
Figure 9C:
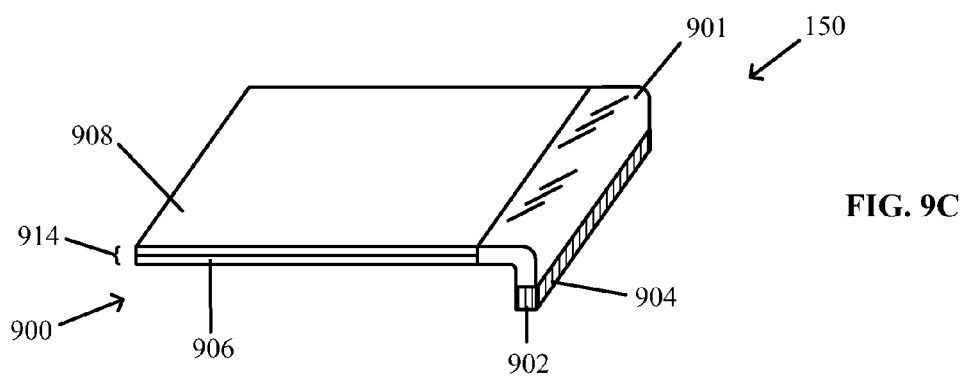
FIG. 9C shows a profile view of a removable user interface according to a third embodiment.

FIGS. 9A to 9C show profile views of removable user interface 150 according to various embodiments. These embodiments illustrate the use of various technology for enabling removable user interface 150 to display information and/or receive user input.

FIG. 9A shows a profile view of removable user interface 150 according to a first embodiment. According to this embodiment, removable user interface 150 may include a capacitive touch pad.

Removable user interface 150 includes a body 900 having a bend 901, an engagement end 902, and a plug 904 located at the engagement end 902. Body 900 includes a conductive layer 906 which may be made from any suitable conductive material, for example, a transparent conductor such as indium tin oxide. Body 900 also includes an insulating layer 908, where insulating layer 908 may be made of any suitable insulating material, for example, a transparent insulator such as glass. Spacing elements (not shown) such as non-conductive separator dots may be provided between conductive layer 906 and insulating layer 908. A capacitive touch pad may thereby be formed via the interface between conductive layer 906 and insulating layer 908.

In this embodiment, the combined conductive layer 906 and insulating layer 908 may provide a user interface element similar to the previously discussed user interface element 154. Numerous techniques may be used to communicate changes in capacitance from the capacitive touch pad to plug 904, where plug 904 may correspond to the previously discussed plug 152. For example, conductive elements (not shown) may extend from the corners of the capacitive touch pad to plug 904, and electronic computing device 110 may calculate the location of a users touch based on the voltages provided from each corner. For another example, conductive layer 906 may be etched with a grid pattern for some or all of the surface contacting insulating layer 908 so as to form a grid pattern of electrodes. The grid pattern may then be electrically coupled to plug 904, and electronic computing device 110 may calculate the location of a users touch based on the voltages provided from the grid pattern. For yet another example, grid pattern electrodes may be provided only at predetermined locations of the capacitive touch pad, such as at locations corresponding to tactile feedback elements 156.

FIG. 9B shows a profile view of removable user interface 150 according to a second embodiment. According to this embodiment, removable user interface 150 may include a removable capacitive touch pad.

Removable user interface 150 includes a body 900 having a bend 901, an engagement end 902, and a plug 904 located at the engagement end 902. Body 900 includes a frame 910 having an aperture 912 formed therethrough. Frame 910 may be made of any suitable solid material, such as metal, ceramic, polymers, composite materials, etc. Aperture 912 is sized and shaped to receive a user interface element such as a capacitive touch pad 914. Capacitive touch pad 914 includes a conductive layer 916, insulating layer 918, and spacing elements similar to those discussed with reference to FIG. 9A.

Capacitive touch pad 914 is sized and shaped to fit into aperture 912. Touch pad 914 may have a friction fit with aperture 912, and/or may be bonded to frame 910. Numerous techniques may be used to communicate changes in capacitance from capacitive touch pad 914 to plug 904, similar to those discussed above with reference to FIG. 9A.

FIG. 9C shows a profile view of removable user interface 150 according to a third embodiment. According to this embodiment, a capacitive touch pad is coupled to an engagement end of removable user interface 150.

Removable user interface 150 includes a body 900 having a bend 901, an engagement end 902, and a plug 904 located at the engagement end 902. Body 900 includes a conductive layer 906 and an insulating layer 908 similar to those discussed with reference to FIG. 9A, which form a capacitive touch pad 914. In this embodiment, however, engagement end 902 is different than conductive layer 906. Bend 901 of body 900 may be made of any suitable material as discussed above with reference to frame 910. Further, touch pad 914 is bonded to bend 901. Numerous techniques may be used to communicate changes in capacitance from capacitive touch pad 914 to plug 904, similar to those discussed above with reference to FIG. 9A.

Although the embodiments discussed above with reference to FIGS. 9A to 9C are discussed in the context of capacitive touch pads, any suitable components for displaying information and/or receiving user may be provided in place of the capacitive touch pad. For example, a resistive touch pad could be provided in place of capacitive touch pad 914. For another example, an LCD could be provided in place of capacitive touch pad 914. For yet another example, suitable layers for forming an LCD could be provided above or below capacitive touch pad 914. Various replacements and combinations are understandable by those skilled in the art, and all such replacements and combinations are within the scope of the embodiments disclosed herein.

Figure 10:
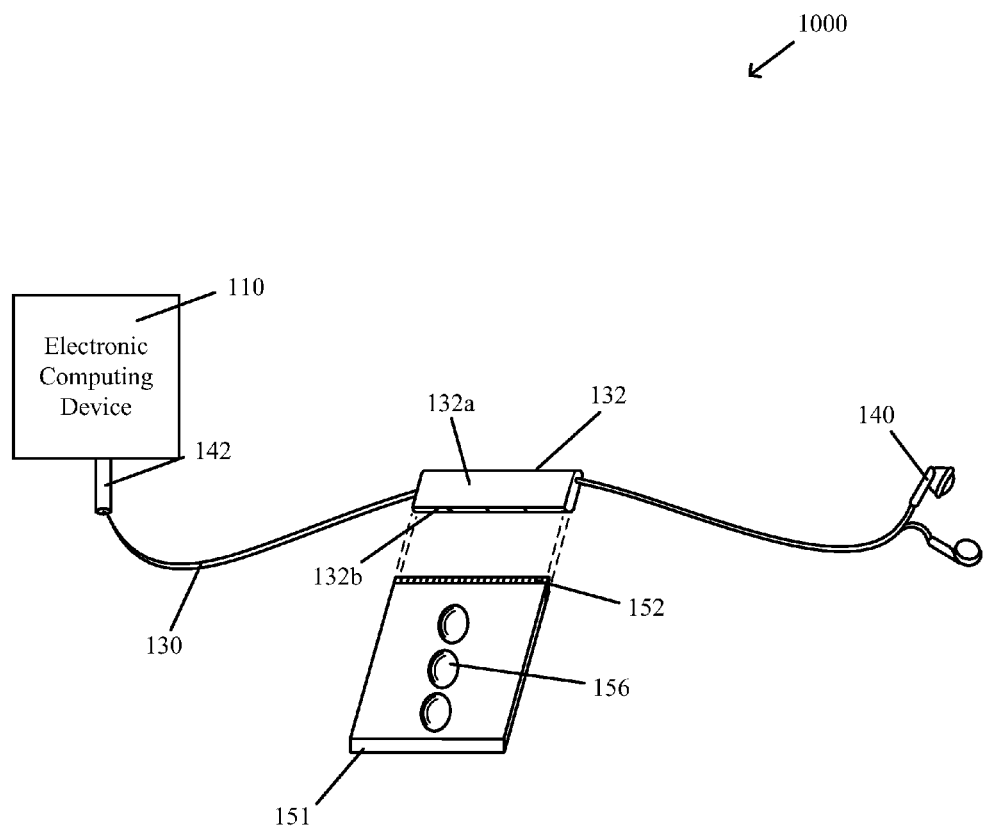
FIG. 10 illustrates a portable electronic system according to a second embodiment.

FIG. 10 illustrates a portable electronic system 1000 according to a second embodiment. Portable electronic system 1000 includes an electronic computing device 110, a cable 130 for establishing an electrical connection with electronic computing device 110, and a removable user interface 151. Electronic computing device 110 may be the same as that previously discussed, and removable user interface 151 may be the same as previously discussed removable user interface 150. In one embodiment, removable user interface 151 does not include bend 153. In general, removable user interface 151 may be operable to control electronic computing device 110 via cable 130.

Cable 130 includes a cable connector 132 which may be, for example, a receptacle connector similar to the previously discussed receptacle connector 122. In this case, cable connector 132 includes a housing 132a defining a cavity 132b, where cavity 132b includes one or more receptacle electrodes similar to those previously discussed for receptacle connector 122. Cable connector 132 also includes internal circuitry for interfacing cable 130 with the receptacle electrodes, such that an electrical connection may be established between electronic computing device 110 and removable user interface 151. Similarly, removable user interface 151 includes the previously discussed plug 152, operable to mate with and establish an electrical connection with cable connector 132.

Cable 130 may also include one or more audio output elements 140 that are operable to output audio signals. For example, audio output elements 140 may be speakers. Audio output elements 140 are electrically connected to cable 130 such that an electrical connection is established between electronic computing device 110 and audio output elements 140 via cable connector 132. Audio output elements 140 are located at an end of cable 130 opposite an end connectable to electronic computing device 110. The end connectable to electronic computing device 151 may include any suitable connector 142 for connecting to electronic computing device 110. For example, connector 142 may be an audio connector. Cable connector 132 is located between the end of cable 130 at which audio output elements 140 are located and the end of cable 130 that is connectable to electronic computing device 110.

As mentioned, removable user interface 151 may be the same as previously discussed removable user interface. For example, removable user interface 151 may have a side profile such as that discussed with reference to FIGS. 4A to 4E. Similar to that discussed above, removable user interface 151 may be operable to control electronic computing device 110, and electronic computing device 110 may be operable to control removable user interface 151.

Figure 11A:
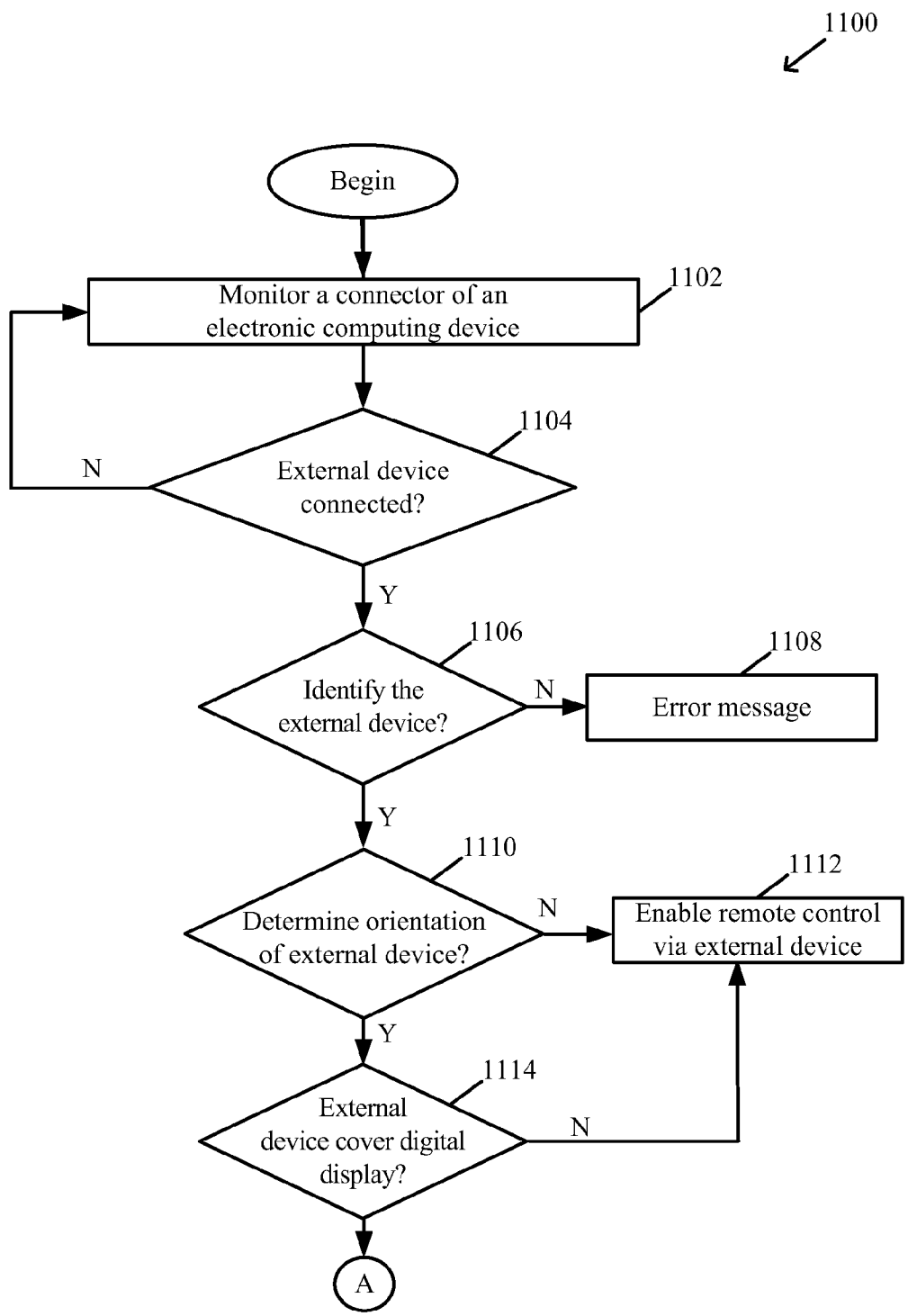
FIG. 11A shows a first portion of a method of operating an electronic computing device according to an embodiment.

FIG. 11A shows a first portion of a method 1100 of operating electronic computing device 110 according to an embodiment. In operation 1102, electronic computing device 110 monitors a connector of electronic computing device 110. For example, electronic computing device 110 may monitor the previously discussed connector 122. In one embodiment, monitoring is performed by checking electrical voltage, current, and/or resistance at the electrical conductors (e.g., pins) housed in connector 122 at predetermined intervals.

In operation 1104, electronic computing device 110 determines whether an external device is connected. For example, electronic computing device 110 may determine whether an external device such as removable user interface 150 is connected to electronic computing device 110 via connector 122. Any suitable technique for determining whether an external device is connected may be used. In one embodiment, this determination may be made by recognizing a change in at least one of electrical voltage, current, and/or resistance at the electrical conductors housed in connector 122. For example, when the resistance at one of the electrical conductors housed in connector 122 changes from a first resistance to a second predetermined resistance, electronic computing device 110 may determine that an external device is connected. If electronic computing device 110 determines that an external device is not connected, electronic computing device returns to operation 1102 and continues to monitor a connector. If, on the other hand, electronic computing device 110 determines that an external device is connected, electronic computing device performs operation 1106.

In operation 1106, electronic computing device 110 attempts to identify the connected external device. Any suitable technique for device identification may be performed. In one embodiment, upon connection the external device sends a device identifier, which is a data packet indicating an identify of the external device. Electronic computing device 110 may compare the received device identifier with pre-stored identifiers. If there is a match, then electronic computing device 110 successfully identifies the external device. If there is no match, then electronic computing device 110 does not successfully identify the external device. In another embodiment, the external device may have unique characteristics, such as a unique pin arrangement, resistance, voltage response characteristic, etc. Electronic computing device 110 may store information associating such characteristics with device identifiers. Accordingly, upon connection, electronic computing device 110 may identify the external device by comparing any recognized characteristics with the pre-stored characteristics.

If electronic computing device 110 can not identify the external device, processing may continue with operation 1108. In operation 1108, electronic computing device 110 may issue a visual and/or audio error message indicating that it does not recognize the external device. If, on the other hand, electronic computing device 110 identifies the external device, processing may continue with operation 1110. In some embodiments, processing continues with operation 1110 only if the external device identified is a removable user interface. For example, processing may continue only if the external device identified is the previously discussed removable user interface 150.

In operation 1110, electronic computing device 110 attempts to determine the orientation of the external device. Numerous techniques may be used for determining the orientation of the external device. In one embodiment, the orientation may be determined by the pin connections. For example, with reference to FIG. 7A, the external device may only have pins on one surface of its connector. Accordingly, electronic computing device 110, which also only has pins on one surface of its connector, may determine the orientation based on whether the pins of the external device contact the pins of electronic computing device 110. For another example, with reference to FIG. 7B, the external device may have pins on both surfaces of its connector, but the pins may be at different spacings with respect to one another such that the pins of the external device contact different pins of electronic computing device 110 based on the orientation of the connection. In another embodiment, the orientation may be determined based on variable characteristics of the external device. For example, with reference with FIG. 4D, a resistance of removable user interface 150 may change based on an rotational position of rotatable element 403b. Electronic computing device 110 may determine the orientation by measuring the resistance of removable user interface 150. Accordingly, electronic computing device 110 may determine the orientation by detecting a rotation of the external device relative to electronic computing device 110.

If electronic computing device 110 cannot determine an orientation of the external device, processing may continue with operation 1112. In operation 1112, electronic computing device 110 enables remote control via the external device. That is, electronic computing device 110 may execute functionality in response to a user-interaction with the external device. In some embodiments, remote control is enabled only if the external device identified is a removable user interface.

If electronic computing device 110 determines an orientation of the external device, processing may continue with operation 1114. In operation 1114, electronic computing device 110 determines whether the external device covers at least a portion of an electronic display such as digital display 118. Such a determination may be made based on the determined orientation. That is, each orientation may be pre-associated with information indicating whether the device covers at least a portion of digital display 118. Accordingly, upon determining the orientation, electronic computing device 110 may read stored information associated with the orientation indicating whether the device covers at least a portion of digital display 118.

If electronic computing device 110 determines that the external device does not cover any part of digital display 118, processing may continue with operation 1112. In operation 1112, electronic computing device 110 enables remote control via the external device. That is, electronic computing device 110 may execute functionality in response to a user-interaction with the external device. In some embodiments, remote control is enabled only if the external device identified is a removable user interface.

Figure 11B:
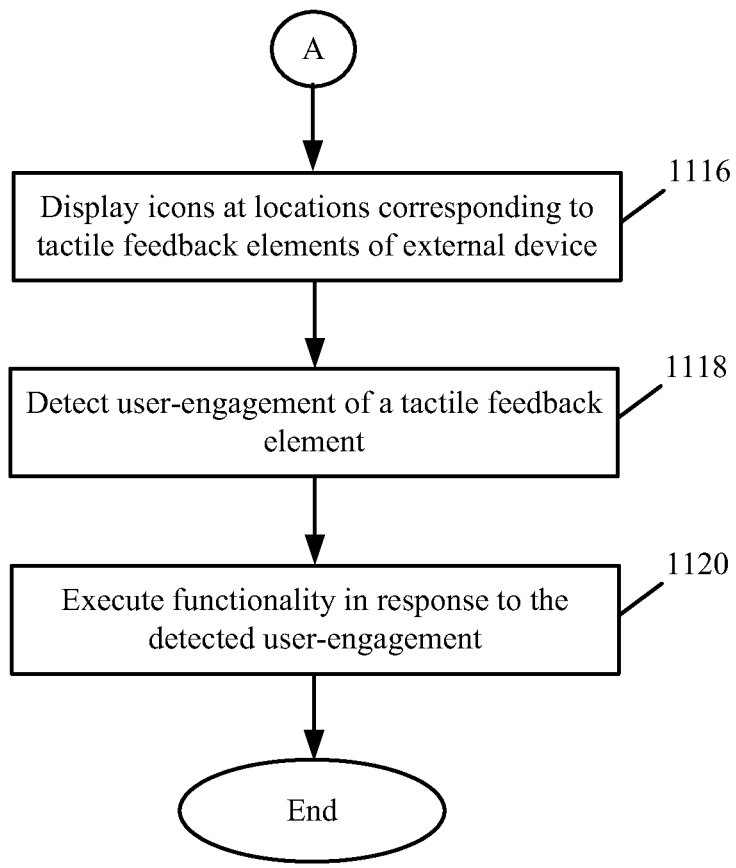
FIG. 11B shows a second portion of a method of operating an electronic computing device according to an embodiment.

If electronic computing device 110 determines that the external device covers at least a portion of digital display 118, processing may continue with operation 1116, as shown in FIG. 11B. In operation 1116, electronic computing device 110 displays icons at locations corresponding to tactile feedback elements of the external device. In one embodiment, electronic computing device 110 may store location information for each external device, where the location information indicates locations of tactile feedback elements relative to digital display 118. Upon identifying the external device, electronic computing device 110 may read the stored location information to determine the locations of tactile feedback elements. Electronic computing device 110 may then display information such as icons at locations of digital display 118 that correspond to the tactile feedback elements. For example, the icons may be located below the tactile feedback elements. Accordingly, the icons may be visible to a user via the tactile feedback elements.

In operation 1118, electronic computing device 110 detects user-engagement of a tactile feedback element. Such detection may be made as a result of a close proximity between the tactile feedback element and a touch-sensitive region. Any suitable technique for detecting the location of a user's touch may be used. For example, as previously discussed, techniques for capacitive touch pads, resistive touch pads, etc. may be used. In response to detecting user-engagement of a tactile feedback element, processing may continue with operation 1120.

In operation 1120, electronic computing device 110 executes functionality associated with the icon corresponding to the tactile feedback element engaged by the user. For example, the icon may show a 'play song' icon, and the icon may be visible via a tactile feedback element. Upon user-engagement with that tactile feedback element, electronic computing device 110 may execute functionality to play a song.

An example is now provided with reference to some of the previously discussed embodiments. With reference to FIG. 1, while removable user interface 150 is not connected to electronic computing device 110, electronic computing device 110 may continue to operate as normal, while simultaneously monitoring connector 122. Upon connecting removable user interface 150 to electronic computing device 110, electronic computing device 110 may determine that an external device is connected, and subsequently identify the external device as removable user interface 150.

With reference to FIG. 2A, electronic computing device 110 may determine that removable user interface 150 is connected to electronic computing device 110 in an orientation where removable user interface 150 covers at least a part of digital display 118. Electronic computing device 110 may then determine the locations where tactile feedback elements 156 are relative to digital display 118. Electronic computing device 110 may then display icons (e.g., A, B, C, D, E, and F) on digital display 118 in locations corresponding to locations of tactile feedback elements 156. In this fashion, the icons may be visible through tactile feedback elements 156. A user may then touch a tactile feedback element. For example, a user may touch a tactile feedback element corresponding to letter D. In response, electronic computing device 110 may then perform a functionality associated with the letter D.

With reference to FIG. 3A, electronic computing device 110 may determine that removable user interface 150 is connected to electronic computing device 110 in an orientation where removable user interface 150 does not cover any portion of digital display 118. In this case, electronic computing device 110 does not necessarily change the information on digital display 118, and may allow control of electronic computing device 110 via removable user interface 150.

Various embodiments for removable user interfaces and electronic computing devices according to the present invention have been described. While these inventions have been described in the context of the above specific embodiments, many modifications and variations are possible. For example, in one embodiment and with reference to FIG. 1, digital display 118 may display information and/or receive user inputs. For example, digital display 118 may be a touch pad display operable to both display information and receive user inputs, and could be any suitable touch pad, such as a resistive touch pad, a capacitive touch pad, etc. The above description is therefore for illustrative purposes and is not intended to be limiting. Also, references to top or bottom, or front and back of the various structures described above are relative and are used interchangeably depending on the point of reference. Similarly, dimensions and sizes provided throughout the above description are for illustrative purposes only and the inventive concepts described herein can be applied to structures with different dimensions. Accordingly, the scope and breadth of the present invention should not be limited by the specific embodiments described above and should instead be determined by the following claims and their full extend of equivalents.

What is claimed is:

1. An apparatus adapted to be operatively coupled to a separate electronic device, the apparatus comprising:
    a body having an engagement end, a user interface area, and a bend located between the engagement end and the user interface area;
    a connector located at the engagement end, the connector adapted to couple to a corresponding connector on the electronic device;
    a user interface element carried by the body in the user interface area, the user interface element operable to perform at least one of: receiving a user input and displaying information;
    a plurality of conductive elements coupled between the user interface element and the connector for communicating electrical signals between the user interface element and the connector; and a plurality of tactile feedback elements provided proximate to the user interface element for providing tactile feedback to a user;

wherein the bend enables the user interface area to wrap around a portion of the electronic device when the connector is coupled to the corresponding connector on the electronic device; and wherein the tactile feedback elements are located on opposite surfaces of the body.

2. The device of claim 1 wherein the user interface area of the body is transparent.

3. The device of claim 1 wherein the connector is a 30-pin connector, a USB connector, a firewire connector, an audio jack, a serial connector, a parallel connector, a monitor connector, or a magnetic connector.

4. The device of claim 1 wherein the connector includes:
an upper surface;
a lower surface arranged opposite the upper surface;
contact electrodes arranged on the upper surface for establishing an electrical connection with the electronic device when the connector is coupled to the electronic device in a first orientation; and
contact electrodes arranged on the lower surface for establishing an electrical connection with the electronic device when the connector is coupled to the electronic device in a second orientation.

5. The device of claim 1 wherein the tactile feedback elements include at least one protrusion or cutout.

6. The device of claim 1 wherein the user interface element is an electronic display.

7. The device of claim 6 wherein the electronic display is a light-emitting diode display, electroluminescent display, plasma display panel, liquid crystal display, thin-film transistor display, organic light-emitting display, swept-volume display, varifocal mirror display, emissive volume display, or holographic display.

8. The device of claim 1 wherein the user interface element is a touch pad operable to both display information and receive a user input.

9. The device of claim 1 wherein the bend includes at least one of a curved portion and a straight portion such that the bend is approximately 180 degrees.

10. The device of claim 1 wherein the bend includes at least one rotatable element for rotatably coupling the user interface element to the connector.

11. A removable clip for providing a removable user interface to a portable electronic computing device having a display surface and a rear surface arranged opposite the display surface, the clip comprising:
a body including an interface portion and an engagement end, the interface portion including first and second surfaces opposing one another and having a plurality of touch-sensitive regions;
a plurality of tactile feedback elements arranged on or formed by the first surface, each tactile feedback element being arranged over one of the plurality of touch-sensitive regions,
a connector located at the engagement end for mechanically and electrically coupling the body to the electronic computing device; and
a plurality of conductive traces extending within the body to the connector and operable to communicate electrical signals indicative of user-engagement with the touch-sensitive regions to the electronic computing device;
wherein the clip is operable to communicate the electrical signals to the electronic computing device when the connector engages the electronic computing device such that the first surface is exposed to receive user input and the second surface is oriented to face the display surface of the electronic computing device.

12. The removable clip of claim 11 wherein the clip is operable to removably attach the electronic computing device to an object when the connector engages the electronic computing device such that the second surface is oriented to face the rear surface of the electronic computing device.

13. A portable electronic system comprising:
an electronic computing device including a device connector, a display surface, and a rear surface, the rear surface being arranged opposite the display surface; and
a removable user interface including:
a body having an engagement end;
an interface connector located at the engagement end for mating with the device connector so as to couple the body to the electronic computing device;
a user interface element for displaying information or receiving a user input;
a conductive element extending between the user interface element and the connector for communicating an electrical signal between the user interface element and the electronic computing device,
wherein the removable user interface is couplable to the electronic computing device such that the removable user interface is disposed over at least a part of the display surface; and
wherein the removable user interface further includes a plurality of tactile feedback elements, and the electronic computing device is operable to display icons on the display surface at locations corresponding to the plurality of tactile feedback elements.

14. The portable electronic system of claim 13 wherein the electronic computing device is operable to select a displayed icon in response to a user engagement with a corresponding tactile feedback element.

15. The portable electronic system of claim 13 wherein the connector is configured so that the removable user interface is couplable to the electronic computing device in a plurality of different orientations.

16. The portable electronic system of claim 13 wherein the removable user interface further includes at least one rotatable element located between the interface connector and the user interface element, wherein the rotatable element is operable to rotate the removable user interface from an orientation where the removable user interface is proximate the display surface of the electronic computing device to an orientation where the removable user interface is proximate the rear surface of the electronic computing device.

17. A method comprising:
monitoring a connector of an electronic computing device;
identifying a removable user interface when the user interface is coupled to the connector;
determining an orientation of the removable user interface when the user interface is coupled to the connector; and
displaying information on an electronic display of the electronic computing device based on the determined orientation of the removable user interface; and
wherein displaying information includes displaying icons on the electronic display in locations corresponding to locations of tactile feedback elements included with the removable user interface.

18. The method of claim 17 wherein determining an orientation includes detecting a rotation of the removable user interface relative to the electronic computing device.

19. The method of claim 17 further comprising detecting a user engagement with a surface of the removable user interface.

20. The method of claim 19 further comprising executing a function in response to the detected user engagement.

21. The method of claim 17 wherein the removable user interface can be coupled to the connector in either a first or a second orientation and determining an orientation includes detecting whether the removable user interface is connected in the first or the second orientation.

\* \* \* \* \*